United States Patent
Misaka et al.

(10) Patent No.: US 8,392,856 B2
(45) Date of Patent: Mar. 5, 2013

(54) SEMICONDUCTOR DEVICE AND LAYOUT DESIGN METHOD FOR THE SAME

(75) Inventors: Akio Misaka, Osaka (JP); Yasuko Tabata, Shiga (JP); Hideyuki Arai, Toyama (JP); Takayuki Yamada, Toyama (JP)

(73) Assignee: Panasonic Corporation, Osaka (JP)

( * ) Notice: Subject to any disclaimer, the term of this patent is extended or adjusted under 35 U.S.C. 154(b) by 199 days.

(21) Appl. No.: 13/013,442

(22) Filed: Jan. 25, 2011

(65) Prior Publication Data
US 2011/0272815 A1 Nov. 10, 2011

(30) Foreign Application Priority Data
May 10, 2010 (JP) .................................. 2010-108285

(51) Int. Cl.
*G06F 17/50* (2006.01)
(52) U.S. Cl. ................ 716/55; 716/54; 716/50; 716/134
(58) Field of Classification Search .................... 716/50, 716/54, 55, 134
See application file for complete search history.

(56) References Cited

U.S. PATENT DOCUMENTS

| | | | |
|---|---|---|---|
| 5,637,424 A * | 6/1997 | Haruki et al. ..................... | 430/5 |
| 6,197,452 B1 | 3/2001 | Matumoto | |
| 6,660,462 B1 | 12/2003 | Fukuda | |
| 6,710,855 B2 * | 3/2004 | Shiraishi ......................... | 355/67 |
| 7,131,102 B2 * | 10/2006 | Dai et al. ......................... | 716/55 |
| 2005/0044522 A1 | 2/2005 | Maeda | |
| 2005/0076320 A1 | 4/2005 | Maeda | |
| 2005/0116268 A1 | 6/2005 | Tahira et al. | |
| 2006/0084261 A1 | 4/2006 | Iwaki | |
| 2006/0157833 A1 | 7/2006 | Mashita et al. | |
| 2006/0271902 A1 | 11/2006 | Yamashita et al. | |
| 2008/0224176 A1 | 9/2008 | Nakanishi et al. | |
| 2008/0265335 A1 | 10/2008 | Ryu et al. | |

FOREIGN PATENT DOCUMENTS

| | | |
|---|---|---|
| JP | 09-311432 | 12/1997 |
| JP | 11-95406 | 4/1999 |
| JP | 2005-116557 | 4/2005 |
| JP | 2006-235080 | 9/2006 |

* cited by examiner

*Primary Examiner* — Vuthe Siek
*Assistant Examiner* — Brian Ngo
(74) *Attorney, Agent, or Firm* — McDermott Will & Emery LLP

(57) ABSTRACT

A semiconductor device includes: a plurality of line features including at least one real feature which includes a gate electrode portion, and at least one dummy feature. Two of multiple ones of the dummy feature, and at least one of the line features interposed between the two dummy features and including the at least one real feature form parallel running line features which are evenly spaced. The parallel running line features have an identical width, and line end portions of the parallel running line features are substantially flush. Line end portion uniformization dummy features are formed on extensions of the line end portions of the parallel running line features. The line end portion uniformization dummy features include a plurality of linear features each having a same width as each of the line features and spaced at intervals equal to an interval between each adjacent pair of the line features.

17 Claims, 13 Drawing Sheets

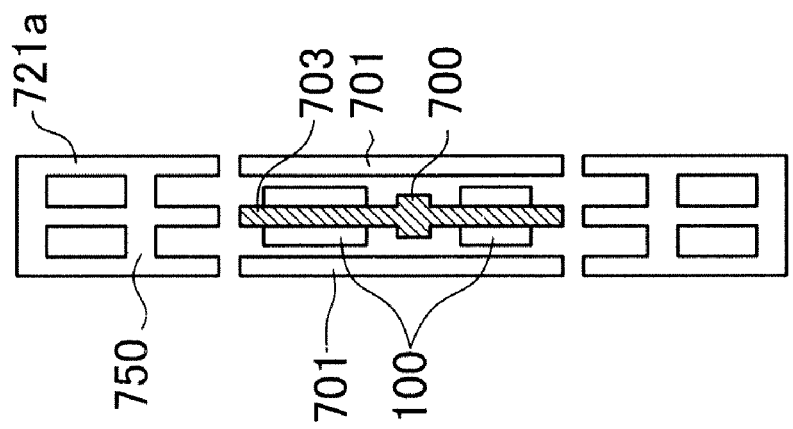
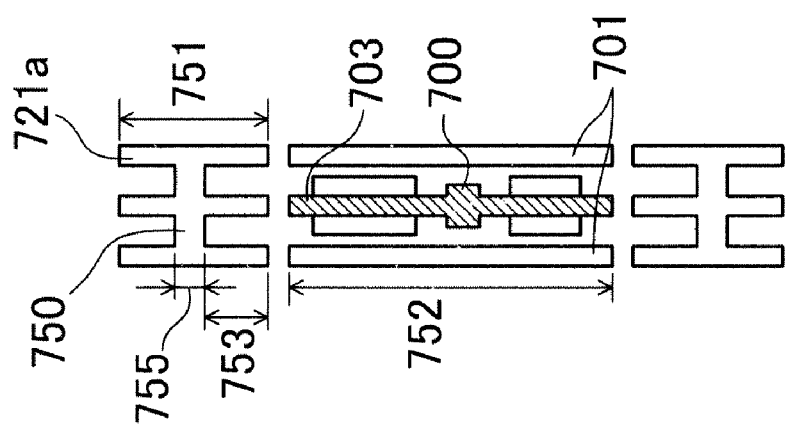
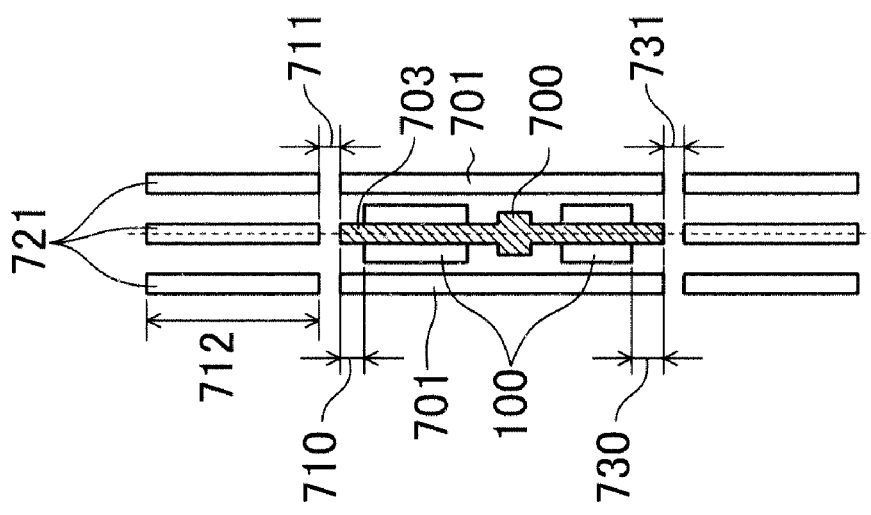

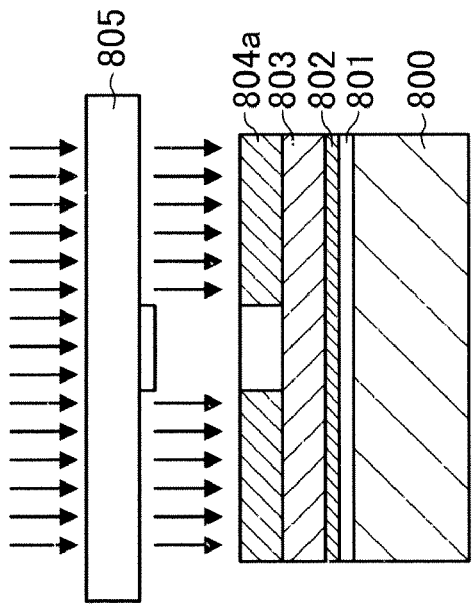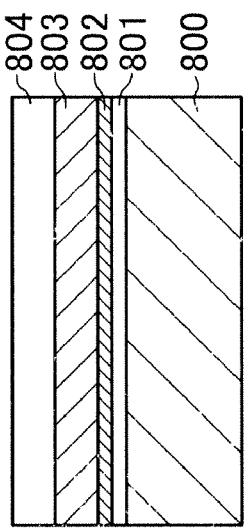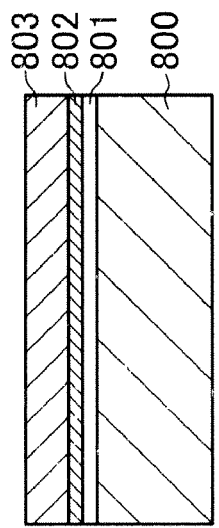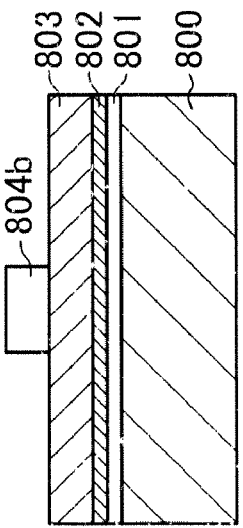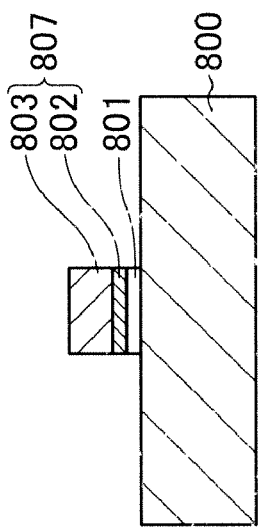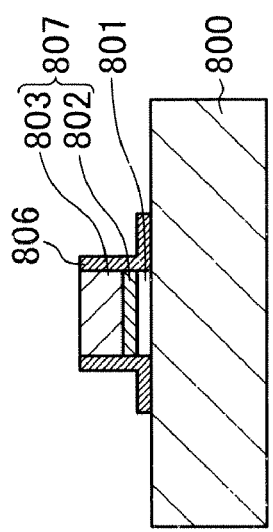

901

IXc    902    IXc'

902

903 ies. The dummy features do not substantially function as portions of a circuit, and are provided, e.g., in order to increase the accuracy of finished features and reduce poorly patterned features.

SEMICONDUCTOR DEVICE AND LAYOUT DESIGN METHOD FOR THE SAME

CROSS-REFERENCE TO RELATED APPLICATION

This application claims priority to Japanese Patent Application No. 2010-108285 filed on May 10, 2010, the disclosure of which including the specification, the drawings, and the claims is hereby incorporated by reference in its entirety.

BACKGROUND

In recent years, in order to increase the degree of integration of large-scale integrated circuit devices (hereinafter referred to as LSIs) using a semiconductor, the size of a circuit pattern has been further reduced. As a result, great importance is placed on refinement of a line feature forming a circuit and a reduction in the size of a contact hole, etc., for connecting multilayered interconnects through insulating layers, and a finer feature than the finest feature which can be formed by being exposed to light using lithography has needed to be formed.

With such a reduction in the circuit pattern size, it has been more difficult to allow the finished dimensions of some layout features forming certain shapes to coincide with the intended design dimensions thereof. This is due to the influence of, e.g., an optical proximity effect in a lithography process step out of essential process steps of an LSI fabrication process, and a microloading effect in an etching process step out of them.

To address this problem, methods are introduced in which the feature dimensions and shape of an exposure mask are corrected by performing accurate simulation to provide intended finished dimensions. Examples of the methods include optical proximity correction (OPC). However, it is difficult to provide an accuracy high enough to correct large-scale data, and an enormous amount of calculation time for the correction is also required.

Therefore, a method has been proposed in which dummy features are placed to reduce layout variations causing the above-described effects, i.e., to achieve uniform feature densities, etc. The dummy features do not substantially function as portions of a circuit, and are provided, e.g., in order to increase the accuracy of finished features and reduce poorly patterned features.

A portion of a circuit pattern which needs to have finished dimensions with the highest accuracy is related to the structure of a transistor. This will be described with reference to FIG. 13 illustrating a layout of a metal oxide semiconductor (MOS) transistor. As illustrated in FIG. 13, a line feature 10 representing a gate layer includes a line portion overlapping with an active layer shape 11 representing an active layer. The overlapping line portion forms a gate portion 13 of the transistor. Portions of the active layer shape 11 between which the gate portion 13 is interposed form source/drain features 14 of the transistor. The line width of the gate portion 13 interposed between the source/drain features 14 is referred to as a gate length 13A, and this value has a significant influence on operation of the transistor.

The gate portion 13 includes line end portions protruding beyond the active layer shape 11. The line end portions are referred to as gate protruding portions 15, and unless the gate protruding portions 15 are each of adequate size, a leakage current is generated between the source and drain of the transistor, thereby causing a serious problem in circuit operation. Furthermore, in recent years, it has been recognized that a protrusion length 15A denoting the length of each of the gate protruding portions 15 which were previously considered to merely need to be of adequate size also has an influence on circuit operation. Thus, the dimensional accuracy of the protruding portion 15 has also become significant.

Next, a method for improving the accuracy of the line width as described in Japanese Patent Publication No. H09-311432 will be described with reference to FIGS. 14A and 14B. FIG. 14A illustrates a situation where real features 21 and dummy features 22 are placed in the above-described method, and FIG. 14B is a cross-sectional view taken along the line XIVb-XIVb' in FIG. 14A. As illustrated in FIGS. 14A and 14B, the real features 21 are formed on a semiconductor substrate 20, and the dummy features 22 are formed on an empty region of the semiconductor substrate 20 on which the real features 21 are not formed. The dummy features 22 each have a width substantially equal to that of each of the real features 21, and are spaced at intervals equal to the interval between each adjacent pair of the real features 21. Such provision of the dummy features 22 allows the feature density to be substantially uniform, thereby improving the accuracy of the line width of each of the line features.

Next, a method for improving the accuracy of the width of a line end portion as described in Japanese Patent Publication No. H11-095406 will be described with reference to FIGS. 15A and 15B. In these figures, real features 30 which are interconnect features, and dot-shaped dummy features 31 located in the vicinities of line end portions of the real features 30 are illustrated. The dot-shaped dummy features 31 can be spaced apart from the real features 30 by a distance substantially equal to the shortest distance between the adjacent interconnect features, and thus, the feature density differences among the vicinities of the line end portions are reduced, thereby reducing variations in finished dimensions.

SUMMARY

However, the degree to which the difference in the density of real features is compensated for by dummy features to provide uniform feature densities, etc., is also limited, and it is difficult, in particular, to obtain sufficiently uniform line widths and sufficiently uniform feature densities in the vicinities of line end portions at the same time. As a result, OPC, etc., still involving accurate simulation is required, thereby requiring a long calculation time to obtain a sufficiently high correction accuracy.

In view of the above, a layout design method which provides both uniform line widths and uniform feature densities in the vicinities of line end portions, and in particular, reduces variations in the width of each of line portions corresponding to the length of each of gates forming gate portions and the protrusion length of each of gate protruding portions, and a semiconductor device using the same will be described hereinafter.

A semiconductor device of the present disclosure includes: a plurality of line features including at least one real feature which includes a gate electrode portion and a protruding portion protruding beyond the gate electrode portion by a predetermined distance, and at least one dummy feature placed in parallel with the at least one real feature, wherein two of multiple ones of the dummy feature, and at least one of the line features interposed between the two dummy features and including the at least one real feature form parallel running line features extending in parallel so as to be evenly spaced, the parallel running line features have an identical width while at least one end portions of the parallel running line features form line end portions substantially flush with one another, line end portion uniformization dummy features are formed on extensions of the line end portions of the parallel running line features so that the distances between the line end portions and corresponding line end portions of the line end portion uniformization dummy features are equal, and the line end portion uniformization dummy features include a plurality of linear features each having a same width as each of the line features and spaced at intervals equal to an interval between each adjacent pair of the line features.

According to such a semiconductor device, a high-performance semiconductor device can be easily obtained as described below.

First, the real feature and the dummy feature all having the same width extend in parallel so as to be evenly spaced, thereby providing a uniform feature layout around the gate electrode portion.

Furthermore, the real feature and the dummy feature are terminated while being aligned so that the line end portions of the real feature are substantially flush with the corresponding line end portions of the dummy feature. The evenly spaced line end portion uniformization dummy features each having the same width as each of the line end portions are formed on extensions of the line end portions so that the distances from the line end portions are equal. In view of the foregoing, a uniform feature layout is provided also around the line end portions. Thus, a uniform feature layout is provided also around the protruding portions corresponding to the line end portions of the real features.

As such, a uniform feature layout is provided around both of the gate electrode portions and the protruding portions, and thus, a feature layout is formed with high accuracy by a simple OPC process which does not require simulation, thereby obtaining a high-performance semiconductor device.

The plurality of linear features of the line end portion uniformization dummy features may be connected together.

This can reduce collapse, separation, etc., of the linear features. This advantage is provided as long as at least adjacent two of the features are connected together, and becomes more significant with an increase in the number of the connected features.

The plurality of linear features of the line end portion uniformization dummy features may be connected together in the vicinities of middles of the linear features in a lengthwise direction.

Features tend to collapse in a process step of soaking a semiconductor device being fabricated in liquid, and one of the causes for this is the surface tensions generated between features. Surface tensions are generated in the vicinities of the middles of the features, and thus, the linear features are preferably connected together in the vicinities of the middles of the linear features.

The parallel running line features may each form a continuous feature, and the lengths of the linear features along a line direction may be equal to one another.

This provides more uniform line features, thereby obtaining a semiconductor device enabling easier formation of features with high accuracy.

Out of the parallel running line features, the at least one line feature interposed between the two dummy features may include both the real feature and the dummy feature.

When the other line features do not extend adjacent to the real feature in parallel with the real feature, the uniformity of the feature layout is reduced around the real feature. In order to prevent or reduce this, when space is formed between each adjacent pair of real features of the parallel running line features, a dummy feature can be placed in the space.

The length of each of the line end portion uniformization dummy features in a line direction may be shorter than the length of each of the parallel running line features in a line direction.

Since the line end portion uniformization features are formed in order to provide a uniform feature layout around the line end portions of the parallel running line features, the line end portion uniformization features may be formed with a length falling within a range of lengths associated with an optical proximity effect, etc. Moreover, when the line end portion uniformization features are too long, the total area of portions of the layout of the semiconductor device occupied by the line end portion uniformization features increases, and thus, in order to prevent or reduce this, the length of each of the line end portion uniformization features is preferably minimized.

The line end portion uniformization dummy features may be formed in a pair so that a region including the at least one real feature is interposed between the line end portion uniformization dummy features.

Thus, the line end portion uniformization features provide a uniform feature layout around both ends of the real features, thereby obtaining an accurately formed semiconductor device.

Both end portions of the parallel running line features may form the line end portions terminated so that the line end portions are substantially flush with one another, and features forming mirror images of the line end portions about a line may be formed on extensions of the line end portions forming both end portions of the parallel running line features so that the distances between the line end portions and corresponding line end portions of the features are equal.

When the other line features are placed on extensions of the corresponding line end portions, which are flush with one another, of the parallel running line features so that the other line features form mirror images of the line end portions about a line, this provides a uniform feature layout around the line end portions. As such, the parallel running line features may be interposed between the line end portion uniformization dummy features and the other line features.

A region including the at least one real feature may be surrounded by at least two types of the dummy features, and out of the at least two types of the dummy features, one type of the dummy features may be the line end portion uniformization dummy features.

Specifically, the semiconductor device of the present disclosure may include another dummy feature further extending in parallel with the parallel running line features, and a dummy feature further surrounding the parallel running line features and the line end portion uniformization dummy features.

A connecting feature which connects the line end portion uniformization dummy features along a lateral direction perpendicular to a longitudinal direction of the dummy features may have a length greater than or equal to approximately 4 µm.

In order to reduce collapse, separation, etc., of the line end portion uniformization dummy features, the connecting feature which connects the linear features along a lateral direction perpendicular to a longitudinal direction of the dummy features preferably have a greater length, and the connecting feature more preferably has, in particular, a length greater than or equal to 4 µm.

When a wavelength of exposure light is $\lambda$, and a numerical aperture of an exposure apparatus is NA, the parallel running line features may each have a width less than or equal to approximately $0.5 \times \lambda / NA$.

When a wavelength of exposure light is λ, and a numerical aperture of an exposure apparatus is NA, the protruding portion may have a length less than or equal to approximately 0.5×λ/NA.

When a wavelength of exposure light is λ, and a numerical aperture of an exposure apparatus is NA, each of the distances between the line end portions and corresponding line end portions of the line end portion uniformization dummy features may be less than or equal to approximately 0.5×λ/NA.

The above structures provide a significant advantage of enabling easy and accurate pattern formation for a semiconductor device with such dimensions making a simple process using lithography difficult.

When a wavelength of exposure light is λ, and a numerical aperture of an exposure apparatus is NA, a length of each of the line end portion uniformization features in a line direction may be greater than or equal to approximately 0.5×λ/NA.

In order to form the line end portion uniformization dummy features, the above-described dimensions are preferably provided.

When a wavelength of exposure light is λ, and a numerical aperture of an exposure apparatus is NA, a width of each of connecting portions providing connection between the linear features included in the line end portion uniformization dummy features may be greater than or equal to approximately 0.3×λ/NA.

In order to more reliably connect the linear features together, the connecting portions preferably each have the above-described width.

The real features may be metal gates. Also in this case, the above-described advantages can be provided.

The parallel running line features may include a wider feature having a width obtained by connecting the plurality of adjacent line features together and including protrusion portions which have a same width as each of the line end portions, extend in parallel with the line end portions so as to be spaced at a same interval as the interval between each adjacent pair of the line end portions, and are terminated so that the protrusion portions are flush with ends of the other line features.

The wider feature may have a shape in which the entire gate electrode portions of the plurality of adjacent real features are connected together. The protruding portions protruding beyond the gate electrode portions each having the same width as the other real features are formed to extend in parallel with the other real features so that the interval between each adjacent pair of the protruding portions are equal to the interval between each adjacent pair of the other real features, and the line end portion uniformization dummy features (or the line end portions of either the real features or dummy features) are formed also on extensions of the protruding portions.

Such a structure enables the formation of gate electrode portions having different gate lengths, and can prevent or reduce the degradation in the uniformity of a feature layout around the line end portions.

Next, the present disclosure is directed to a layout design method for a semiconductor device including real features which each include a gate electrode portion, and dummy features placed in parallel with the real features. The method includes: forming a layout pattern of standard cells each including the at least one real feature and the at least one dummy feature and occupying a rectangular region; and placing line end portion uniformization dummy features around a logic circuit region including multiple arranged ones of the standard cell after formation of the logic circuit region, wherein the forming includes: forming at least one of the real features which includes a gate electrode portion, has a predetermined width, and extends in a predetermined direction; placing the real feature on a corresponding one of evenly spaced parallel grid lines virtually provided in a rectangular cell region; placing the dummy features having a same width as the real feature on empty regions of the corresponding grid line except for a region of the corresponding grid line on which the real feature is placed; and aligning the real feature and the dummy features both terminated while facing some of boundaries of a corresponding one of the standard cells which are perpendicular to a direction of extension of the real feature so that line end portions of the real feature and the dummy features are substantially flush with one another, and the placing the line end portion uniformization dummy features includes: placing a plurality of linear features forming mirror images of the line end portions about a line on extensions of the line end portions toward at least one of the boundaries so that distances between the line end portions of the real feature and the dummy features and corresponding line end portions of the plurality of linear features are equal; and forming a feature obtained by connecting the plurality of linear features together.

According to such a layout design method for a semiconductor device, a layout can be designed with high uniformity of a feature layout around both of the gate electrode portions and the line end portions (protruding portions) of the real features. Thus, accurate dimensions and shapes of the gate electrode portions and the protruding portions are provided even by a simple OPC process which does not require simulation, and variations in the above dimensions and shapes are reduced, thereby obtaining a high-performance semiconductor device.

According to the layout design method described above, the dimensional accuracy of the gate electrode portion of each of the line features can be improved, and dimensional variations in the feature interval between each adjacent pair of the plurality of gate electrode portions can be significantly reduced. Moreover, the accuracy of the finished end portions (protruding portions protruding beyond the gate electrode portions) of the line features can be also improved. This advantage becomes more significant with an increase in the degree of miniaturization of features formed in a lithography process step in the fabrication of a semiconductor device. Thus, a semiconductor device with higher performance, and a layout design method for the same can be provided.

BRIEF DESCRIPTION OF THE DRAWINGS

FIGS. 7A-7C are diagrams each illustrating an example of a pattern configuration according to the embodiment of the present disclosure.

FIGS. 8A-8F are diagrams illustrating an example method for fabricating a semiconductor device according to the embodiment of the present disclosure.

FIGS. 9A-9D relate to the example method for fabricating a semiconductor device according to the embodiment of the present disclosure, in which FIG. 9A is a diagram illustrating a design feature, FIGS. 9B and 9C are diagrams illustrating a mask feature, and FIG. 9D is a diagram illustrating a finished feature.

FIGS. 11A-11D relate to the example method for fabricating a semiconductor device according to the embodiment of the present disclosure, in which FIG. 11A is a diagram illustrating a design feature, FIGS. 11B and 11C are diagrams illustrating a mask feature when the enhancer mask is used, and FIG. 11D is a diagram illustrating a finished feature when the enhancer mask is used.

DETAILED DESCRIPTION

An embodiment of the present disclosure will be described hereinafter with reference to the drawings.

Figure 1:
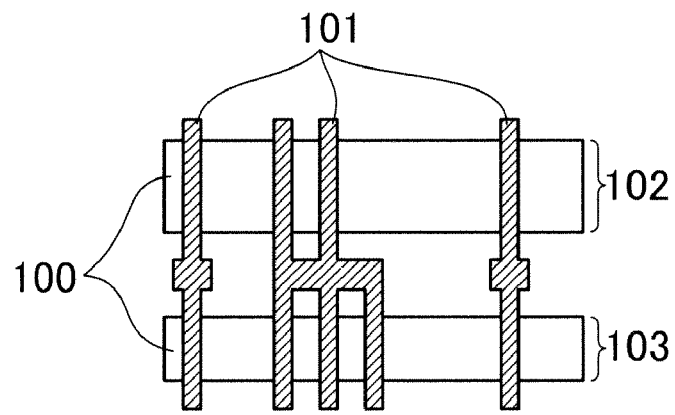
FIG. 1 is a diagram illustrating a layout design method for an example semiconductor device according to an embodiment of the present disclosure, and illustrates a layout of an active layer and real features each including a gate electrode portion.

FIG. 1 is a diagram illustrating a physical layout structure of an example semiconductor integrated circuit according to this embodiment. In the layout structure, features of a plurality of layers, such as active layer shapes 100 and gate layer features 101, are stacked on a semiconductor substrate. A layout of a group of features forming at least one transistor as described above is referred to as a cell. An entire integrated circuit is formed by creating and placing a plurality of cells performing different circuit operations.

These cells are referred to also as a library because each of them is repeatedly placed on a plurality of regions of the integrated circuit. Furthermore, a cell forming a complementary metal oxide semiconductor (CMOS) logic circuit is referred to as a standard cell because the cell includes two types of transistors, i.e., a p-type transistor 102 and an n-type transistor 103, and is created as a cell implementing a basic logic function.

When masks for use in fabrication of a semiconductor device are formed, data on the features of the plurality of layers as illustrated in FIG. 1 is divided into layers, and the resultant data is computerized, thereby creating mask data. The mask data is used to form masks for forming the features of the layers on the semiconductor substrate. Specifically, masks are formed which each have a mask shape corresponding to the feature of the corresponding layer in a logic layout structure and configured to provide the feature on the semiconductor substrate.

A layout pattern of the example semiconductor integrated circuit of this embodiment and a method for creating the layout pattern will be described hereinafter.

First, the width of each of line features having gate electrode portions is fixed at a predetermined width, e.g., 30 nm. Specifically, all of gates existing in one cell have a predetermined gate length. The directions of the line features having the gate electrode portions in one cell are preferably identical.

Figure 2A:
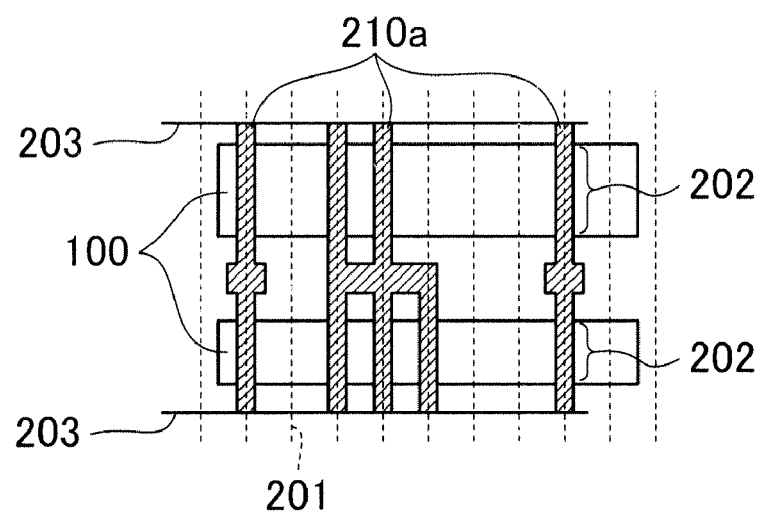
FIGS. 2A and 2B are diagrams illustrating the layout design method subsequent to FIG. 1, and illustrate a layout of evenly spaced grid lines and dummy features.

FIG. 2A illustrates a layout of active layer shapes 100 and line features (hereinafter referred to as real features 210a) including gate electrode portions 202 in one cell. The gate electrode portions 202 are portions of the real features 210a overlapping with the active layer shapes 100.

As illustrated in FIG. 2A, grid lines 201 placed so as to be spaced at regular intervals in a predetermined direction (in a lateral direction in FIG. 2A) are assumed, and the real features 210a are placed on the grid lines 201.

The real features 210a are configured such that their line end portions are flush with one another at cell boundaries. Specifically, as illustrated in FIG. 2A, the real features 210a are all terminated on straight lines 203 forming the upper and lower boundary lines of the cell without protruding beyond and being located between the straight lines 203.

The real features 210a may be connected together, e.g., in the vicinities of their middle portions (along a direction crossing the grid lines 201). The real features 210a may include a feature which is not continuous from the upper end of the cell to the lower end thereof (a feature which is broken somewhere along the corresponding grid line 201).

Figure 2B:
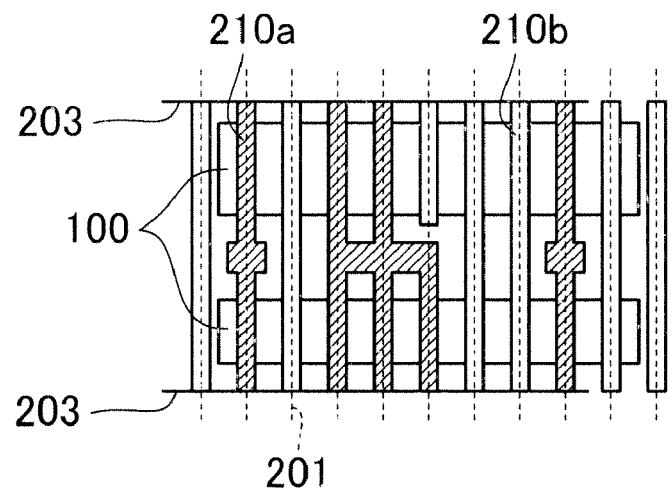

Next, as illustrated in FIG. 2B, dummy features 210b which are line features each having the same width as each of the real features 210a are placed on empty regions, on which no feature is located, of the grid lines 201 adjacent to the gate electrode portions 202 of the real features 210a. Thus, the gate electrode portions 202 are interposed between line features (the real features 210a and the dummy features 210b) which have the same width as each of the gate electrode portions 202 and are laterally adjacent to the gate electrode portions 202, and are spaced apart from the line features. As such, parallel running line features are formed by the real features 210a and the dummy features 210b.

Such a layout of the dummy features 210b can provide uniform feature densities around the gate electrode portions 202. Consequently, when patterning is actually conducted to provide this layout, the gate electrode portions 202 having the same feature width are easily obtained. In some cases, dummy features placed to extend in parallel with the real features 210a including the gate electrode portions 202 are hereinafter referred to as gate portion uniformization dummies.

Typically, when the wavelength of exposure light and the numerical aperture of an exposure apparatus are λ and NA, respectively, in an exposure process step of a lithography process, patterning for obtaining a feature having a size less than or equal to 0.5×λ/NA is difficult, and patterning for obtaining a feature having a size less than or equal to 0.3×λ/NA is very difficult. Therefore, such a layout of the real features 210a and the dummy features 210b as described above is particularly advantageous for improving the dimensional accuracy of line features each having a line width less than or equal to 0.5×λ/NA, and is further advantageous for features each having a line width less than or equal to 0.3×λ/NA.

As an example of the wavelength of exposure light, 193 nm (ArF excimer laser) can be used, and when immersion exposure is used, the numerical aperture NA is 1.2. Thus, a specific example of the line width providing a significant advantage is less than or equal to 80 nm, and a specific example of the line width providing a more significant advantage is less than or equal to 48 nm.

When there exists an empty region of a grid line 201 between an adjacent pair of the dummy features 210b, a dummy feature 210b is preferably placed also on the empty region. This allows the feature density on a wider region surrounding the gate electrode portions 202 to be uniform, and thus, is advantageous for improving ease of patterning and accuracy.

In view of the foregoing, dummy features are more preferably placed also at cell boundaries to extend in parallel with the line features of the cell. Specifically, in FIG. 2B, dummy features are placed to the left and right of the cell. Regions in which the feature density in the layout is made uniform by placing dummy features as described above are preferably regions each having a boundary to which the distance from the corresponding gate electrode portion 202 is greater than the wavelength of exposure light. Furthermore, the regions are more preferably regions each having a boundary to which the distance from the corresponding gate electrode portion 202 is approximately three times as large as the wavelength of exposure light because this situation allows line features to have the same size, and eliminates or reduces the need for accurate simulation for mask correction.

Furthermore, these dummy features 210b are flush with the line end portions of the real features 210a. Specifically, as illustrated in FIG. 2B, not only the real features 210a but also dummy features 210b are all terminated on the straight lines 203 forming the upper and lower cell boundaries without protruding beyond and being located between the straight lines 203. Similar to the dummy features 210b, the dummy features placed at the cell boundaries are also terminated (on the straight lines 203) so that the dummy features are flush with the real features 210a.

When a real feature 210a broken somewhere along any one of the grid lines 201 exists, a dummy feature 210b is placed also on a portion of the grid line 201 on which the real feature 210a does not exist.

Figure 3A:
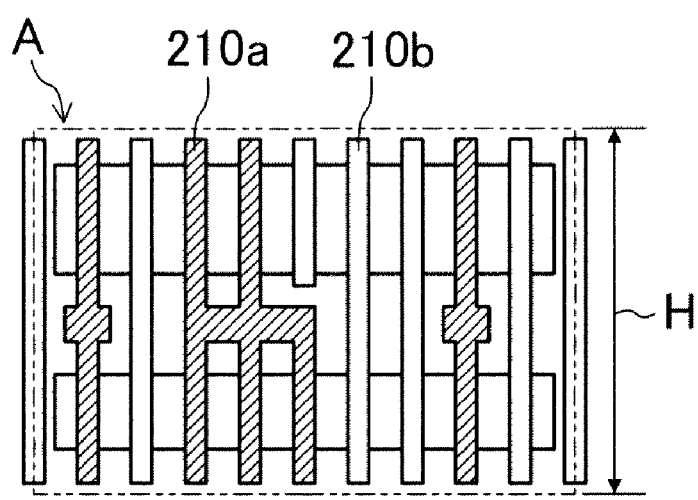
FIGS. 3A-3C are diagrams illustrating the layout design method subsequent to FIGS. 2A and 2B, and each illustrate an example library of a standard cell.
Figure 3B:
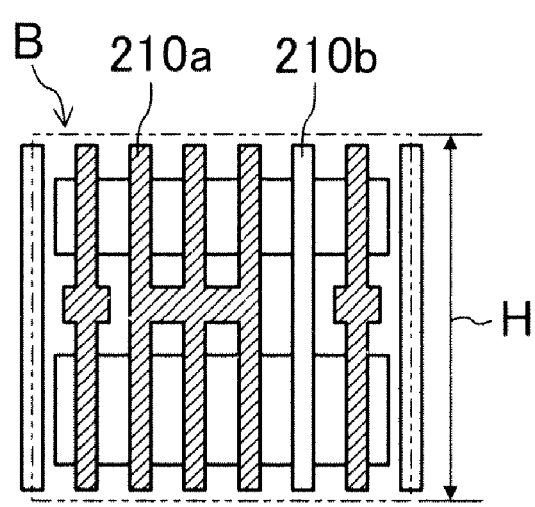
Figure 3C:
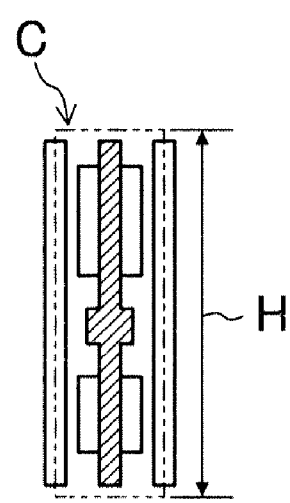

A plurality of cells configured as described above are prepared, and form a library forming an LSI circuit. For example, as illustrated in FIGS. 3A-3C, three types of cells occupying a rectangular region, i.e., cells A, B, and C, are prepared as a library. As a basic structure of a CMOS transistor, a transistor including two types of gate electrode portions, i.e., p-type and n-type gate electrode portions, is formed, and thus, a continuous line feature includes two gate electrode portions. A cell configured as described above and forming a portion of a library is also referred to as a standard cell.

The cells A, B, and C are portions of an example CMOS logic library. The continuous line feature provides connection between the two gate electrode portions, and gate protruding portions of the line feature face cell boundaries. When the direction of extension of the line feature is oriented along the height of each of the cells, upper ones of the line end portions forming the gate protruding portions are flush with one another at the upper cell boundary, and lower ones thereof are flush with one another at the lower cell boundary. The distance between the upper line end portions flush with one another and the lower line end portions flush with one another, i.e., the size of the cell along the cell height (cell height H), is standardized among a plurality of cells in a library.

Next, a situation where an intended logic circuit is formed by arranging the cells A, B, and C will be described with reference to FIG. 4.

The cells A-C are placed so that the grid lines on which line features included in one cell are located coincide with the corresponding grid lines on which corresponding line features included in another cell are located. In other words, as illustrated in FIG. 4, cells vertically adjacent to each other (in the direction of extension of the line features) are placed so that the corresponding line features are aligned along the same straight line. For example, a line feature 431 in the cell A and a line feature 432 in the cell B vertically adjacent to the cell A are aligned along the same auxiliary line 401. Although the line features 431 and 432 are both real features, a dummy feature 433 (a gate portion uniformization dummy) is also aligned with the corresponding line feature along the same straight line.

Line end portions of the line features in the upper one of vertically adjacent cells are opposed to those in the lower one thereof in a boundary region between the vertically adjacent cells (intercell boundary region 402) while being the same distance 403 between the corresponding line end portions (hereinafter referred to as "between-line-end-portions distance 403") apart from those in the lower one thereof, and the corresponding line end portions of the line features in the vertically adjacent cells are symmetric about the boundary line between the cells.

Thus, line end portions 412 and 413 are located laterally from a line end portion 411 of one real feature forming a gate protruding portion facing the intercell boundary region 402, and each have the same width as the line end portion 411, and other line end portions are opposed to the line end portions 411, 412, and 413 while being the same distance apart from the line end portions 411, 412, and 413. Consequently, layouts around the line end portions facing the intercell boundary region 402 are matched with one another, thereby providing uniform layout densities. Therefore, in the design of a mask for OPC, etc., the line end portions can easily have the same size without using sophisticated simulation, etc. The burden of calculation for a mask process is reduced, and the dimensional accuracy is also significantly improved.

Furthermore, dummy features 420 are placed on extensions of line end portions 414 facing a boundary region (cell perimeter boundary region 421) between the cells arranged in parallel and an empty region around the cells while being the same between-line-end-portions distance 403 apart from the line end portions 414. In this case, the line end portions of the line features in the cells and corresponding line end portions of the dummy features 420 are symmetric about a line with the cell perimeter boundary region 421 interposed therebetween. The dummy features 420 each have the same width as each of the line features in the cells, and are spaced at intervals equal to the interval between each adjacent pair of the line features.

Thus, the layouts around the line end portions facing the cell perimeter boundary region 421 and located immediately above the cell perimeter boundary region 421 are also matched with the layouts around the line end portions facing the cell perimeter boundary region 421 and located immediately below the cell perimeter boundary region 421, thereby providing uniform layout densities. Therefore, in the design of a mask for OPC, etc., line end portions can easily have the same size without using sophisticated simulation, etc. The burden of calculation for a mask process is reduced, and the dimensional accuracy is also significantly improved. In some cases, the dummy features 420 placed outside the cells so as to be opposed to the line end portions as described above are referred to as line end portion uniformization dummies.

When the wavelength of exposure light and the numerical aperture of an exposure apparatus are λ and NA, respectively, in an exposure process step of a lithography process, the line end portion uniformization dummies are also particularly advantageous for improving the dimensional accuracy of line features each having a protrusion length less than or equal to 0.5×λ/NA, and is further advantageous for line features each having a protrusion length less than or equal to 0.3×λ/NA.

With the configuration as described above, the line end portions of the line features forming the gate protruding portions facing the cell perimeter boundary region 421 and the line end portions of the line features forming the gate protruding portions facing the intercell boundary region 402 can have the same size. Consequently, middle portions of the line features in which the gate electrode portions are located and the line end portions thereof forming the gate protruding portions can all easily have the same size without using sophisticated simulation, etc.

Figure 4:
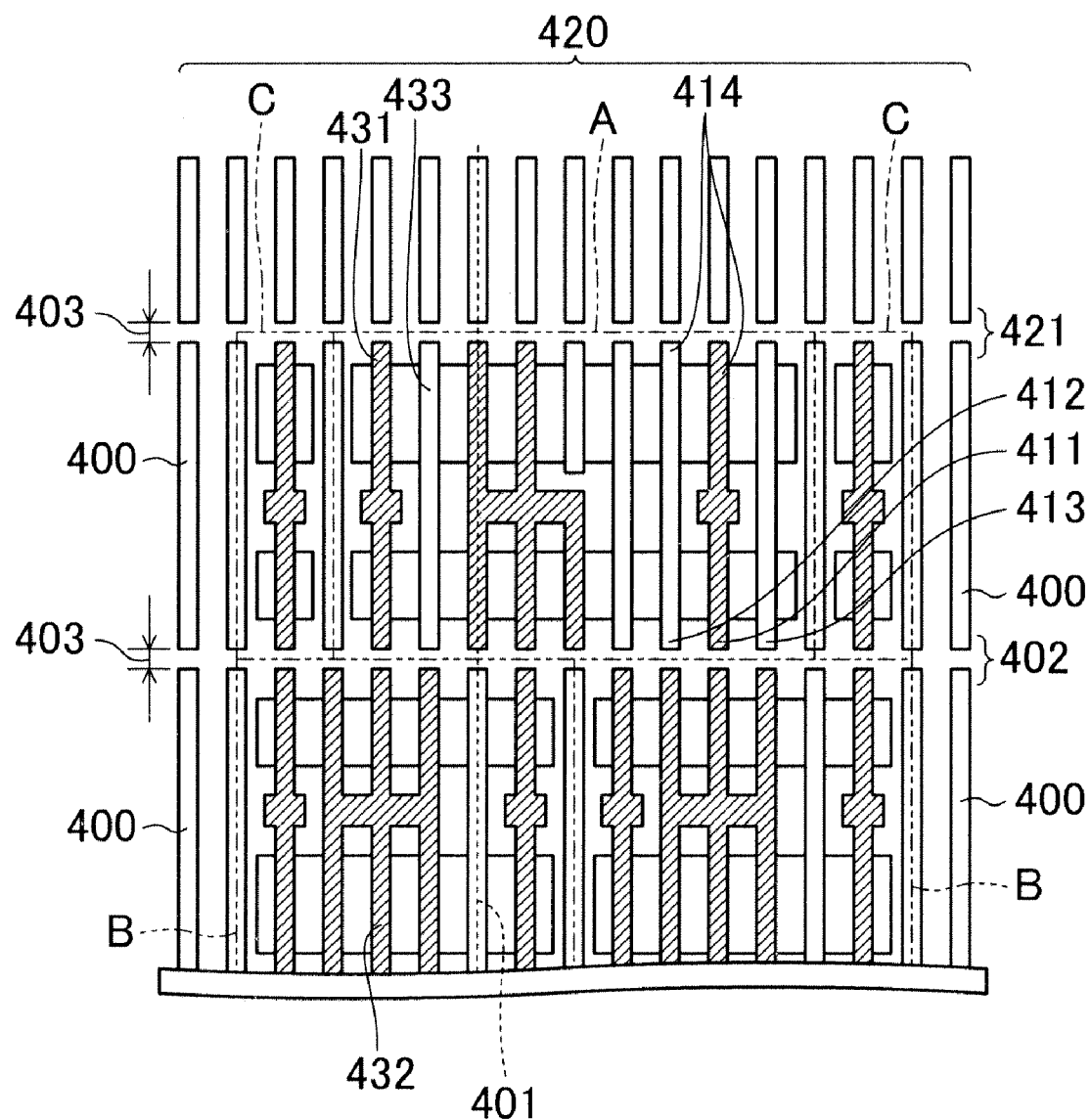
FIG. 4 is a diagram illustrating the layout design method subsequent to FIGS. 3A-3C, and illustrates the configuration of a circuit portion utilizing a library and line end portion uniformization dummies.
Figure 5:
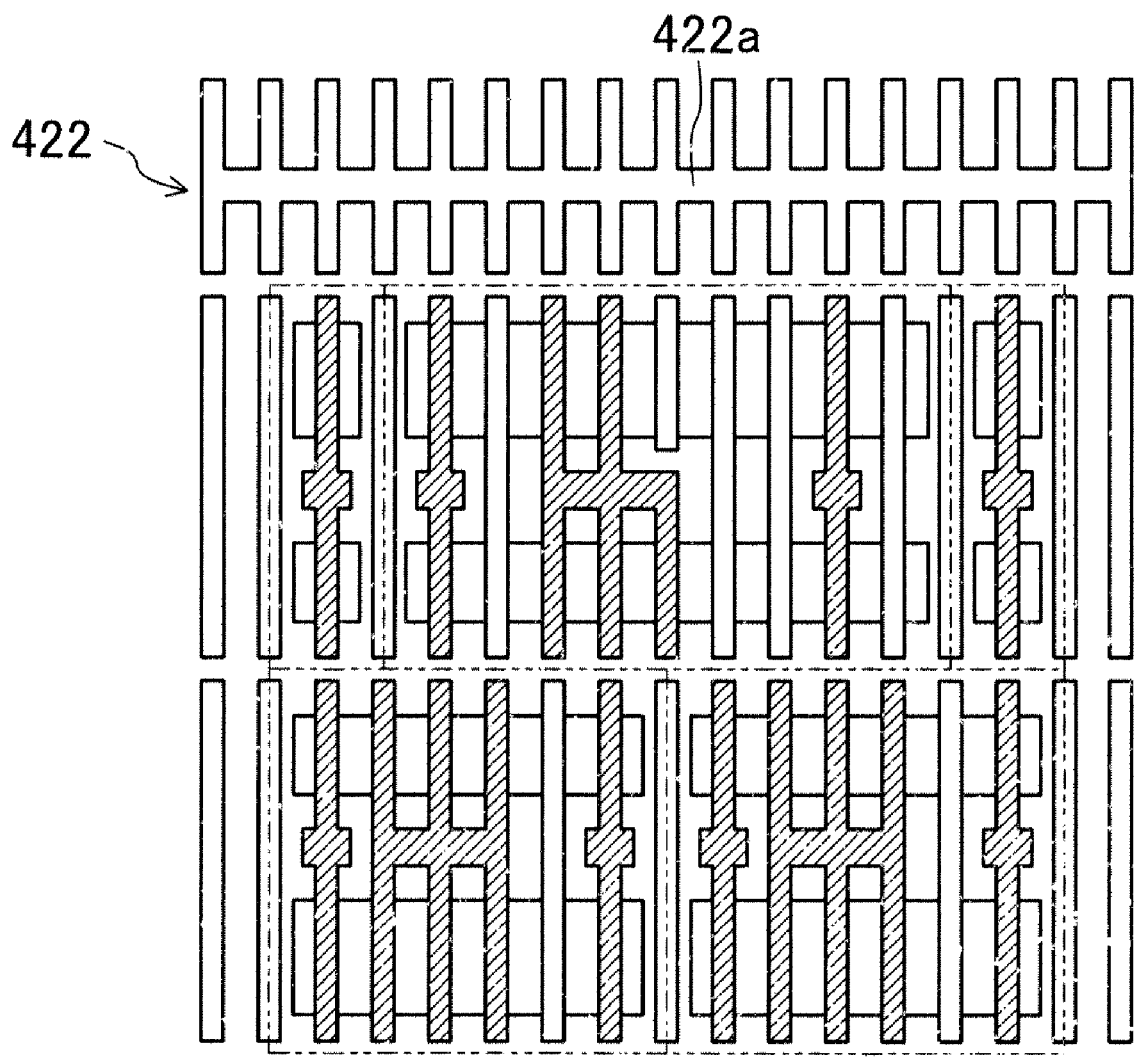
FIG. 5 illustrates the configuration of a circuit portion utilizing a library and line end portion uniformization dummies.

FIG. 5 illustrates a line end portion uniformization dummy 422 according to a variation. As already described above, the line end portion uniformization dummies (dummy features 420) illustrated in FIG. 4 include separate linear features opposed to the corresponding line end portions of the line features in the cells. The line end portion uniformization dummy 422 illustrated in FIG. 5 is obtained by connecting a plurality of linear features similar to the separate linear features together through connecting portions 422a. Although further described in detail below, the above-described structure can reduce the area occupied by the line end portion uniformization dummy, and can avoid causing collapse and separation of the dummy in a fabrication process, etc., for a semiconductor device and the resultant prevention of circuit operation.

Figure 6:
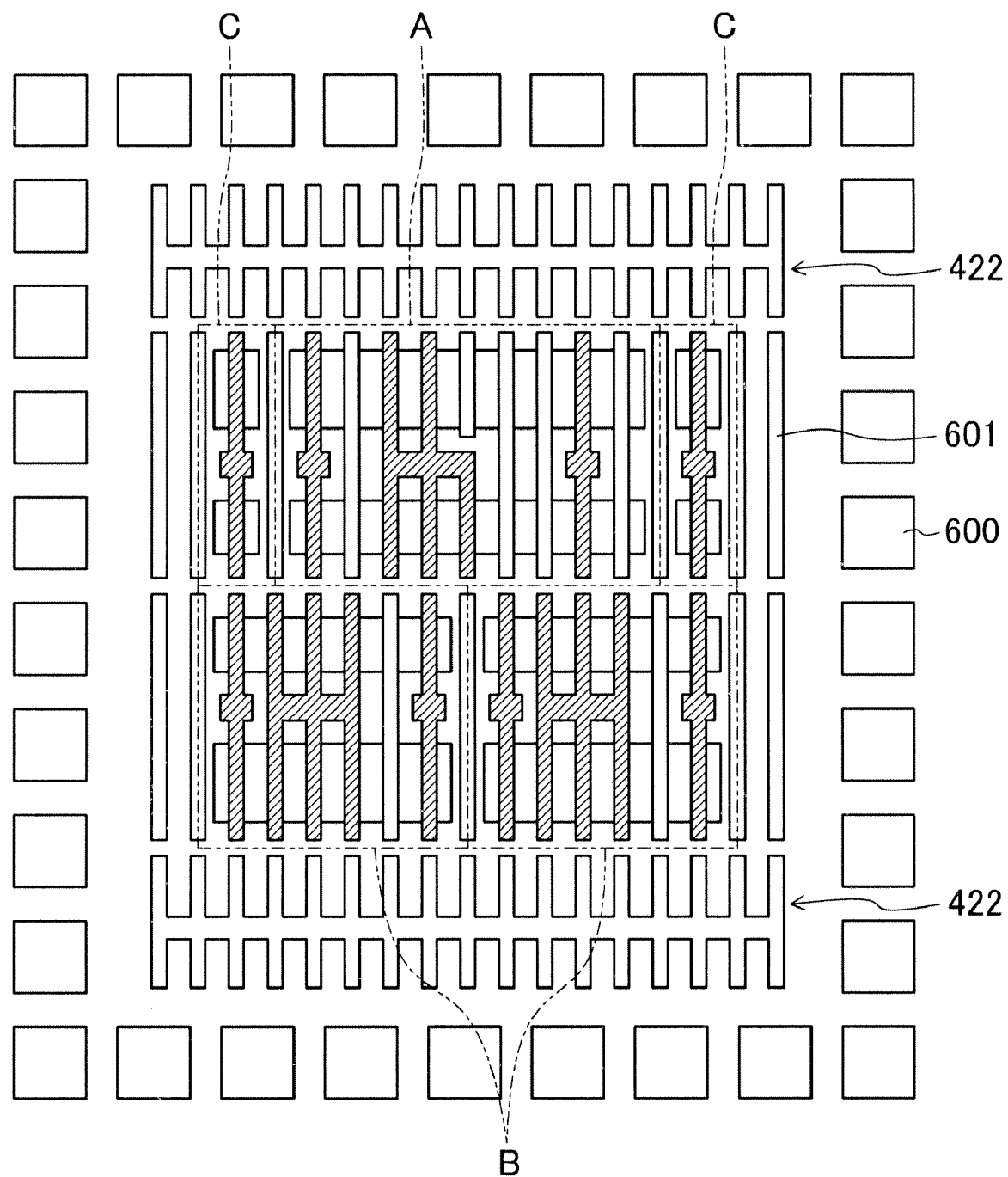
FIG. 6 illustrates the configuration in which a circuit portion is surrounded by a plurality of types of dummy features.

FIG. 6 illustrates a layout according to a further variation. Here, a logic circuit is formed by the cells A, B, and C, and line end portion uniformization dummies 422 are placed one above the other (along the direction of extension of the line features) with the logic circuit interposed therebetween. Furthermore, other dummy features 600 for adjusting the area ratio and the total feature perimeter are provided outside the logic circuit and the line end portion uniformization dummies 422.

This can improve not only the uniformity of the layout densities of portions of the logic circuit but also the uniformity of the area ratio and the total feature perimeter in a wider region. Thus, gate portion uniformization dummies and the line end portion uniformization dummies may be both placed between the real features 210a and the other dummy features 600 for adjusting the area ratio and the total feature perimeter.

Linear dummy features 601 may be further provided to extend in parallel with the line features in the logic circuit (the cells A-C). Such dummy features also contribute to the uniformization of the line features in the logic circuit. The layout as described above may be configured so that the logic circuit is surrounded by the line end portion uniformization dummies 422, the other dummy features 600 for adjusting the area ratio and the total feature perimeter, and the dummy features 601 extending in parallel with the line features in the logic circuit. Furthermore, the line end portion uniformization dummies 422 may include linear features placed on an extension of the line end portions of the dummy features 601 extending in parallel with the logic circuit.

The other dummy features 600 for adjusting the area ratio and the total perimeter each have a shape (a single square shape, a shape corresponding to an assembly of a plurality of features, etc.) different from that of each of the gate portion uniformization dummies and the line end portion uniformization dummies. The other dummy features 600 are spaced apart from the adjacent features, such as dummy features and the line end portion uniformization dummies, at a distance which prevents or reduces mutual interference between the dummy features 600 and the adjacent features. For example, when the wavelength of exposure light and the numerical aperture of an exposure apparatus are λ and NA, respectively, the dummy features 600 are spaced apart from the adjacent features at a distance greater than or equal to λ/NA. The dummy features 600 preferably each have greater dimensions than the real features.

Next, the configuration of features designed using the layout design method as described above will be further described with reference to FIGS. 7A-7C.

FIG. 7A illustrates a layout including only one real feature 700 which is a line feature having a gate electrode portion, and dummy features placed around the real feature 700. However, FIG. 7A is illustrated as a simple example for description, and another real feature may be formed instead of any one of the dummy features.

Gate portion uniformization dummies 701 which are line features having the same width as the real feature 700 are spaced the same distance apart from both sides of the real feature 700 having the gate electrode portion to extend in parallel with the real feature 700. Specifically, the line features forming the layout include parallel running line features including three or more parallel running line features having the same width and spaced the same distance apart from one another to extend in parallel, and at least one of the line features has a gate electrode portion of a transistor, and forms a portion of a circuit element. Such parallel running line features can be obtained by using the gate portion uniformization dummies.

The real feature 700 of the parallel running line features has a line end portion 703 protruding beyond a corresponding one of the gate electrode portions overlapping with a corresponding active layer shape 100 by a predetermined protrusion length 710. Furthermore, the line end portions of the parallel running line features are flush with one another. In other words, the gate portion uniformization dummies 701 of the parallel running line features extend in parallel with the line end portion 703 of the real feature 700, and are terminated so that the gate portion uniformization dummies 701 are flush with the line end portion 703.

Linear line end portion uniformization dummies 721 are placed on extensions of the line end portions of the parallel running line features so as to be opposed to the line end portions of the parallel running line features while being the same distance 711 (hereinafter referred to as the between-line-end-portions distance 711) apart therefrom. The line end portion uniformization dummies 721 each have the same width as the real feature 700 and the gate portion uniformization dummies 701, and extend in parallel while being spaced apart from one another at the same distance as the distance between each adjacent pair of the real feature 700 and the gate portion uniformization dummies 701, and line end portions of the line end portion uniformization dummies 721 are flush with one another.

The above configuration is particularly advantageous for improving the dimensional accuracy of features in which when the wavelength of exposure light in an exposure process step and the aperture ratio of an exposure apparatus are λ and NA, respectively, the protrusion length 710 is less than or equal to 0.5×λ/NA, and is further advantageous for features each having a protrusion length 710 less than or equal to 0.3×λ/NA.

Similarly, also when the between-line-end-portions distance 711 is less than or equal to 0.5×λ/NA, the above configuration is advantageous, and when the between-line-end-portions distance 711 is less than or equal to 0.3×λ/NA, the above configuration is further advantageous.

The reason for this is that when features have dimensions making a process using lithography difficult as described above, a significant advantage of making the layout densities uniform is obtained.

Typically, what has a strong influence on a specific spot in a lithography process is a region within approximately the wavelength of exposure light from the specific spot. A region which is approximately three times the wavelength apart from the specific spot merely has an extremely insignificant influence on the spot. Thus, the length 712 of each of the line end portion uniformization dummies 721 is preferably greater than or equal to 0.5×λ/NA, and is more preferably greater than or equal to λ/NA.

When, similar to the real feature 700 illustrated in FIG. 7A, a real feature includes two gate electrode portions overlapping with the active layer shapes 100, the gate portion uniformization dummies 701 preferably extend in parallel with both of the gate electrode portions. Protruding portions of a real feature protruding beyond the two gate electrode portions preferably have the same protrusion length. Furthermore, the distances between the line end portions forming the protrusion portions and line end portions of the line end portion uniformization dummies opposed to the corresponding line end portions of the real feature 700 are preferably identical. For example, in FIG. 7A, the protrusion lengths 710 and 730 at both ends of the real feature 700 are preferably equal to each other, and the between-line-end-portions distances 711 and 731 are preferably equal to each other.

Such a configuration further improves the uniformity of the layout densities around the real feature 700.

Next, FIG. 7B illustrates a variation of the layout in FIG. 7A. In FIG. 7B, the real feature 700 and the gate portion uniformization dummies 701 are similar to those in FIG. 7A.

In the layout in FIG. 7B, a line end portion uniformization dummy is configured such that linear features 721a are connected together through connecting portions 750.

The length of the line end portion uniformization dummy is preferably greater than or equal to 0.3×λ/NA, and more preferably greater than or equal to 0.5×λ/NA. However, it is not preferable that dummy features which do not function as a portion of a circuit occupy a redundant region. Thus, the length 751 of the line end portion uniformization dummy is preferably shorter than the library height 752 (the library size along the direction in which line features extend (hereinafter referred to as the "line direction")).

In this case, a reduction in the area of a continuous feature tends to cause collapse or separation of the feature in a process for fabricating a semiconductor device. Although dummy features do not function as a portion of a circuit, a separated feature may adhere to the real feature 700 as further described below, thereby causing a critical defect. Therefore, in order to reduce collapse, separation, etc., of a feature, linear features are preferably connected together through the connecting portions 750 to increase the area of a continuous feature. In particular, the total area of the connected linear features is greater than or equal to several times the typical area of the continuous real feature 700, and more preferably greater than or equal to ten times the typical area. A connecting feature which connects the linear features through the connecting portions 750 along a lateral direction perpendicular to a longitudinal direction of the linear features has a length greater than or equal to 4 µm.

Here, the connecting portion width 755 is preferably greater than the width of each of the gate electrode portions, etc., of the real feature 700. Thus, the connecting portion width 755 is preferably greater than or equal to 0.3×λ/NA, and more preferably greater than or equal to 0.5×λ/NA.

In order to provide uniform cell layout densities around the line end portions, the length 753 of each of portions of the line end portion uniformization dummy extending from the connecting portions 750 to the corresponding line end portion 703 is also preferably greater than or equal to 0.3×λ/NA, and more preferably greater than or equal to 0.5×λ/NA.

The linear features 721a are preferably connected together through the connecting portions 750 of the line end portion uniformization dummy in the vicinities of the middles of the linear features 721a. A feature tends to collapse when a semiconductor device being fabricated, e.g., in a development process step for lithography, is soaked in liquid, and the collapse is caused by the surface tension between features. Surface tensions are generated in the vicinities of the middles of the line features, and thus, in order to reduce collapse of features, the linear features 721a are preferably connected together in the vicinities of the middles of the linear features 721a.

FIG. 7C illustrates an example which can more advantageously prevent collapse and separation of a line end portion uniformization dummy. In the example in FIG. 7C, a plurality of connecting portions 750 are provided. In particular, end portions of linear features 721a opposite to line features in a cell are connected together. As a result, fine isolated portions of the line end portion uniformization dummy extending toward an empty region outside a logic circuit are lost, thereby forming a dummy feature which is more resistant to collapse and separation.

The layout for obtaining an accurate line width and an accurate protrusion length of a line feature having gate electrode portions associated with transistor operation was described above. A method for fabricating a semiconductor device having such a layout will be described hereinafter.

FIGS. 8A-8F are cross-sectional views for explaining process steps for fabricating an example semiconductor device according to this embodiment. Here, a semiconductor device using a high-k gate insulating film and a metal gate is used as an example.

First, in a process step in FIG. 8A, a gate insulating film 801, a metal film 802, and a polysilicon film 803 are sequentially stacked on a substrate 800. The gate insulating film 801 is, e.g., a high-k film, and will partially form a gate insulating film of a transistor. The metal film 802 is, e.g., a compound, such as Ti, and the metal film 802 and the polysilicon film 803 will partially form a gate electrode having a multilayer structure.

Next, as illustrated in FIG. 8B, a resist film 804 is formed on the polysilicon film 803. Subsequently, as illustrated in FIG. 8C, the substrate region is exposed to light using a mask 805 having a desired shape corresponding to gate electrode portions, and a predetermined portion of the resist film 804 forms a photosensitive portion 804a. Thereafter, a resist pattern 804b forming a desired shape as illustrated in FIG. 8D is obtained through a development process step of, e.g., soaking the substrate 800 in developer.

Such a lithography process will be further described with reference to FIGS. 9A-9D.

Figure 9A:
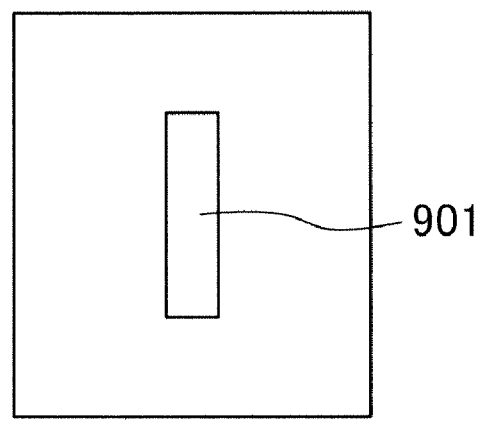
Figure 9B:
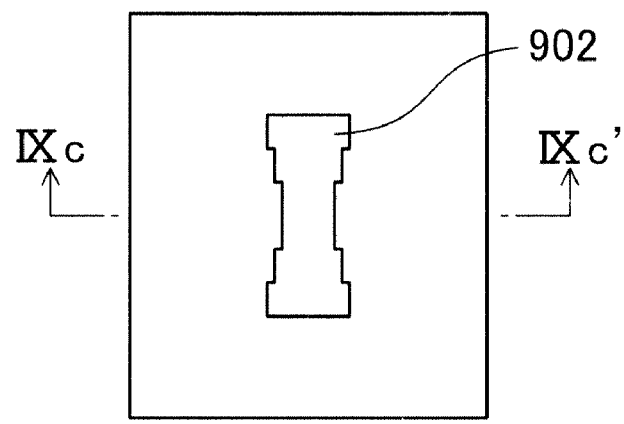
Figure 9C:
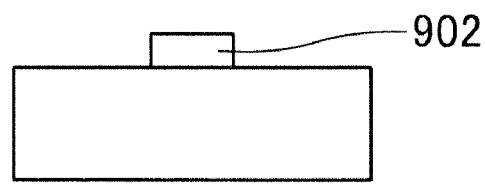

FIG. 9A illustrates a design feature 901 having a desired planar shape. FIG. 9B illustrates a plan view of an exposure mask feature 902 for obtaining the design feature 901, and FIG. 9C illustrates a cross-sectional view taken along the line IXc-IXc' in FIG. 9B. Here, the use of a positive resist is assumed, and a mask is obtained by forming a light-shielding feature corresponding to the design feature 901 on a transparent mask substrate (e.g., a quartz substrate). Here, pattern deformation, etc., is caused during light exposure, and thus, the amount of the pattern deformation is calculated in advance, thereby forming a light-shielding feature having a complicated shape different from that of the design feature 901. Examples of such a shape include a shape in which the line width increases toward line end portions, etc. Computing for obtaining such a shape by the advance calculation is called OPC, and OPC for obtaining the exposure mask feature 902 based on the design feature 901 requires an enormous amount of calculation time.

Figure 9D:
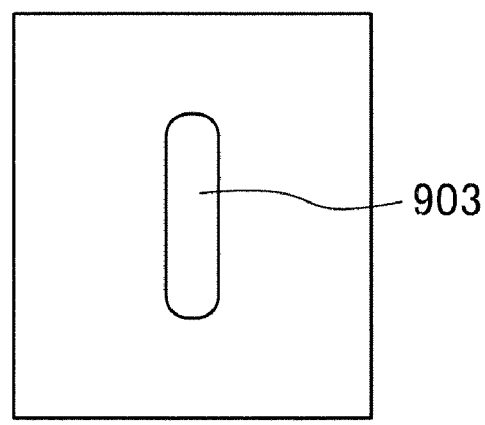

The use of the exposure mask feature 902 illustrated in FIGS. 9B and 9C can provide a finished feature 903 illustrated in FIG. 9D through the lithography process.

Referring back to FIG. 8D, after the resist pattern 804b is formed on the polysilicon film 803, etching is performed using the resist pattern 804b as a mask. Thereafter, the resist pattern 804b is removed.

Thus, as illustrated in FIG. 8E, a gate electrode portion 807 is obtained which is formed on the substrate 800 with the gate insulating film 801 interposed therebetween, includes the metal film 802 and the polysilicon film 803 being stacked, and has a desired shape.

Next, as illustrated in FIG. 8F, a sidewall 806 is formed. The sidewall 806 functions as a mask when impurities are implanted to reduce the electric field between a source and a drain of a normal MOS transistor. Furthermore, when a contact hole is formed in the vicinity of the gate electrode portion 807, the sidewall 806 also functions as an insulating film for protecting the gate electrode portion 807 from etching.

Subsequently, after the process of cleaning, etc., an interconnect layer is formed, thereby electrically connecting the gate electrode portion 807 to the interconnect layer and thus, forming a circuit having a desired function.

For example, in the development process step out of the above process steps, the semiconductor device being fabricated is soaked in developer. In this case, the fine resist pattern may be under stress due to the surface tension, etc., thereby causing collapse, separation, etc., of the resist pattern. As features become finer, such collapse, separation, etc., of the features tends to occur. Therefore, when smaller dummy features than a real feature are formed, connection among the dummy features preferably reduce collapse, etc., of the features.

In particular, in order to reduce the collapse in the development process step, linear features are preferably connected together in the vicinities of the middles of the linear features. Furthermore, a plurality of regions of the linear features are preferably connected together.

Next, a problem unique to a metal gate will be described with reference to FIGS. 10A-10F.

Figure 10A:
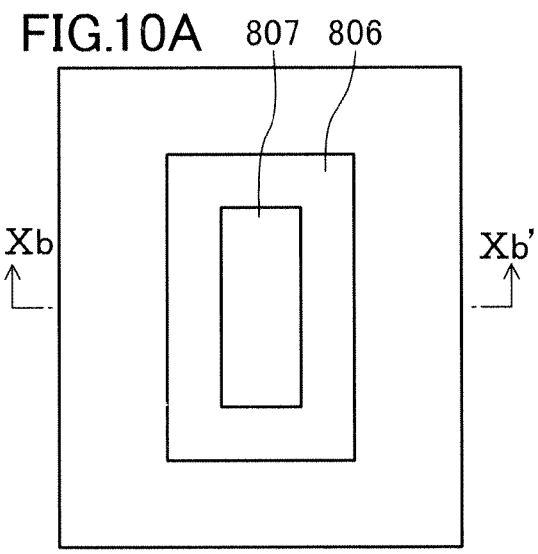
FIGS. 10A-10F relate to the example semiconductor device according to the embodiment of the present disclosure, and are diagrams illustrating a defect which may be caused when a metal gate structure is used.
Figure 10B:
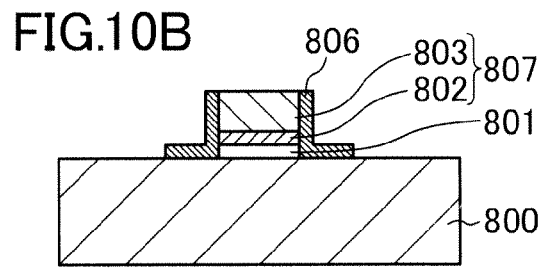

FIG. 10A illustrates a plan view of the gate electrode formed by the method illustrated in FIG. 8A-8F using the mask illustrated in FIGS. 9B and 9C. FIG. 10B illustrates a cross section taken along the line Xb-Xb' in FIG. 10A. Reference characters are similar to those in FIG. 8F.

Figure 10C:
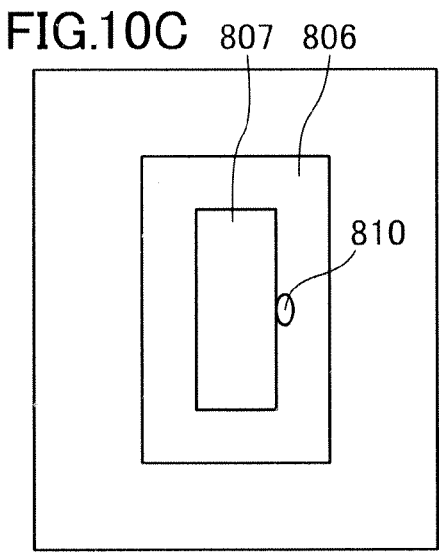
Figure 10D:
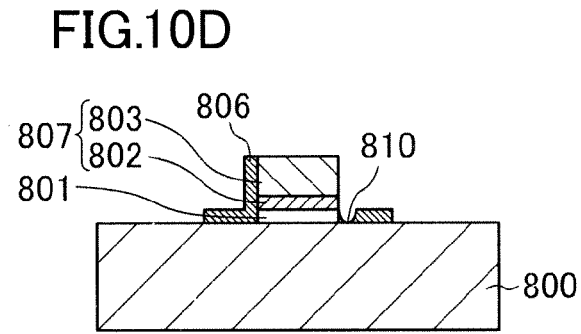

When, as illustrated in FIGS. 10A and 10B, a sidewall 806 is satisfactorily formed, an intended semiconductor device can be obtained. However, as illustrated in FIGS. 10C and 10D corresponding to FIGS. 10A and 10B, respectively, a defect 810, such as a pin hole, may be formed in the sidewall 806, thereby exposing the metal film 802 forming a portion of a metal gate structure.

Figure 10E:
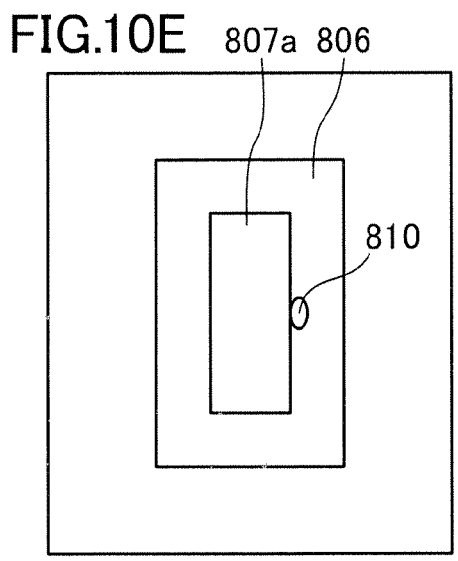
Figure 10F:
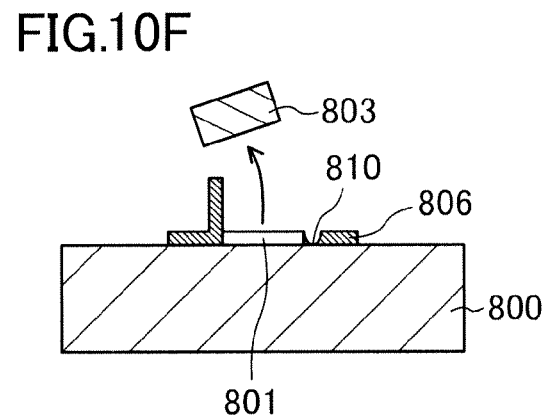

The cause of such a defect 810 is that after the formation of an electrode feature for a gate, a foreign particle defect arising from fine particles, etc., generated prior to the formation of the sidewall 806 is buried in the sidewall 806 during the formation of the sidewall 806. In many cases, such a foreign particle defect occurs in an empty region where a resist dissolves during the development, and moves to a region where features are formed. Thus, it is more likely that the defect 810 will also occur in a region facing the empty region, i.e., the dummy features formed in this embodiment. When the defect 810, such as a pin hole, occurs, a chemical solution penetrating through the defect 810 and reaching the metal film 802 in the cleaning process step may cause dissolution of the metal film 802. Consequently, as illustrated in FIGS. 10E and 10F, the polysilicon film 803, etc., stacked on the metal film 802 is lifted off. In FIG. 10E, the mark forming the lifted-off polysilicon film 803 is illustrated as a lift-off mark 807a. When a component lifted off as described above adheres to a real feature, etc., this causes a critical defect, such as prevention of circuit operation.

When a metal gate structure is used as described above, the metal gate structure includes a metal film 802 tending to dissolve in a chemical solution for cleaning, etc., and thus, a critical defect may occur in a semiconductor device by merely forming a pin hole (a defect 810) due to the adhesion of fine particles, etc., to dummy features.

However, the lift-off causing such a defect occurs when a chemical solution penetrating through the defect 810 causes dissolution of the entire metal film 802 in a continuous feature. Therefore, in order to reduce defects arising from the lift-off, the area of a dummy feature on a region facing the empty region (a region where the defect 810 tends to occur) is preferably increased.

It has been known that when a chemical solution penetrates through a defect in a sidewall and reaches, in particular, a film made of a titanic compound for use in a semiconductor device and called a high-k metal gate, i.e., a metal film, a portion of the metal film falling within a range of approximately several μm from the exposed surface of the metal film dissolves. Thus, dummy features are preferably connected together so that the sum of the lateral sizes of the connected dummy features and connecting portions interposed between the dummy features is greater than or equal to at least approximately several μm (e.g., approximately 4 μm). Thus, also when the defect 810 is formed in the sidewall 806, dissolution of the metal film across the entire dummy features is reduced, thereby reducing the lift-off of the polysilicon film 803.

Also in a real feature, the lift-off of a polysilicon film may be caused due to a defect, such as a pin hole. However, since, as described above, many of the particles causing a defect are generated in the empty region, the lift-off in the real feature can be reduced by connecting dummy features surrounding the real feature and facing the empty region together. When the total area of the connected dummy features is greater than or equal to 10 times the area of the real feature, this can reliably reduce the loss of the production yield of semiconductor devices due to the lift-off of the dummy features.

An example in which patterning is performed using a normal exposure mask as illustrated in FIGS. 9B and 9C was described above. In contrast, the use of an enhancer mask enables more reliable patterning of line end portions (in particular, the line end portions corresponding to the gate protruding portions) in accordance with a desired design pattern.

A technique, such as double patterning, is not required, thereby providing sufficient resolution through one light exposure.

Figure 11B:
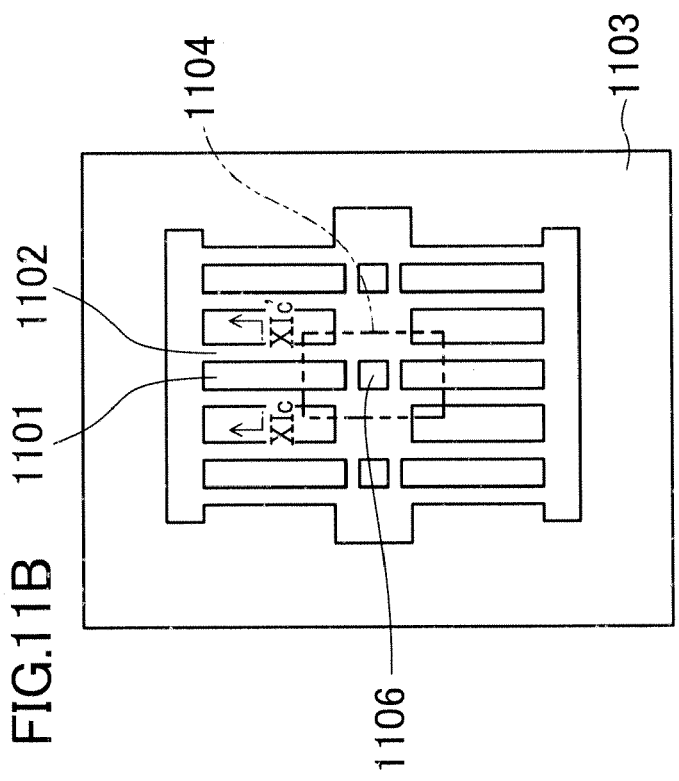
Figure 11D:
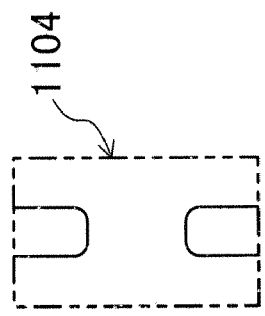
Figure 11A:
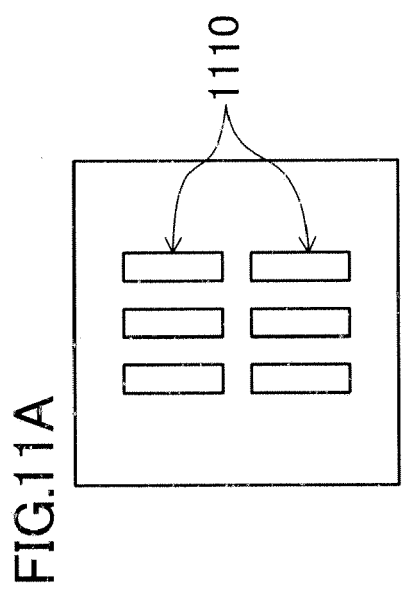

FIGS. 11A-11D are diagrams for explaining an enhancer mask. A mask feature using an enhancer mask to form design features 1110 illustrated in FIG. 11A is formed as illustrated in FIG. 11B which is a plan view and FIG. 11C which is a cross-sectional view taken along the line XIc-XIc' in FIG. 11B. To be specific, phase shifter portions 1101 are formed in regions of a transparent substrate 1103 corresponding to the design features 1101. A semi-light-shielding portion 1102 is formed to surround the phase shifter portions 1101. A region of the semi-light-shielding portion 1102 corresponding to a region 1104 including the opposed line end portions provides connection between the opposed line end portions. Furthermore, an opening 1106 is formed between the opposed line end portions so as to be surrounded by the semi-light-shielding portion 1102.

Figure 11C:
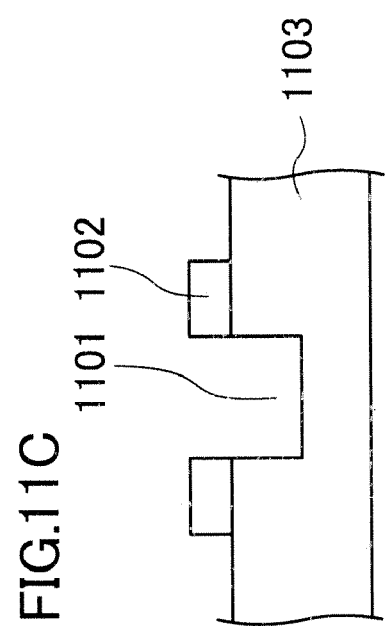

As illustrated also in FIG. 11C, such a mask as described above is obtained by forming the semi-light-shielding portion 1102 on the transparent substrate 1103 and forming the phase shifter portions 1101 by engraving a transparent substrate.

FIG. 11D illustrates a simulation result of pattern formation on the region 1104 in FIG. 11B. The use of an enhancer mask allows each of the line end portions to form a rectangular shape closer to that of a corresponding design feature, and enables a reduction in the interval between each adjacent pair of the line end portions.

Figure 12:
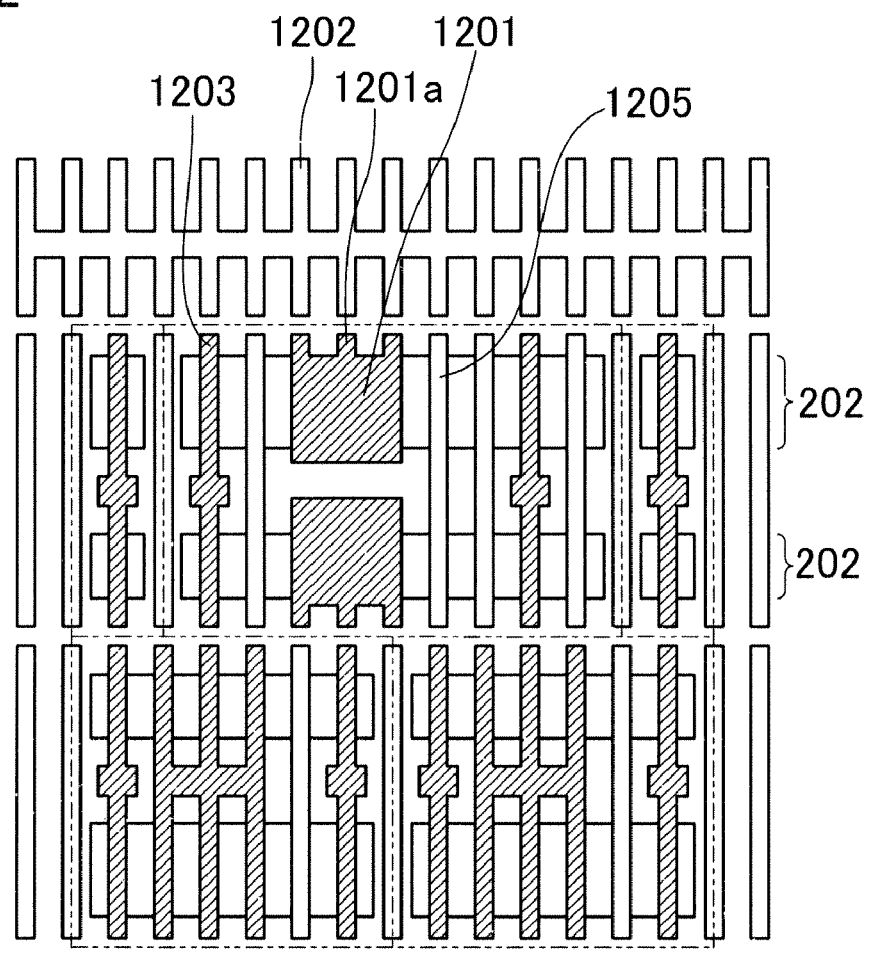
FIG. 12 is a diagram illustrating a layout, which includes gate features with different line widths, of the example semiconductor device according to the embodiment of the present disclosure.
Figure 13:
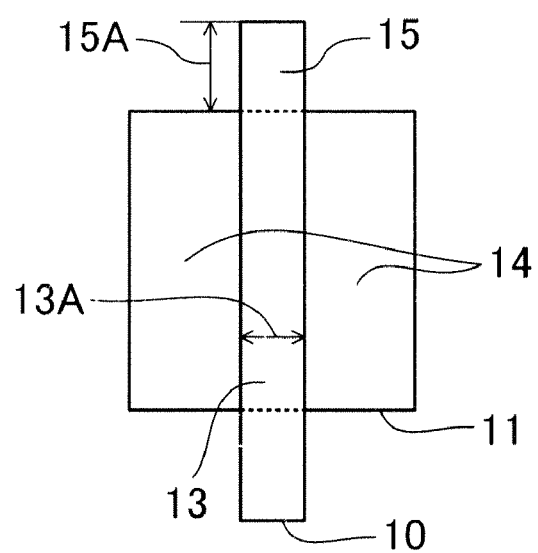
FIG. 13 is a diagram illustrating a layout of a typical transistor.
Figure 14A:
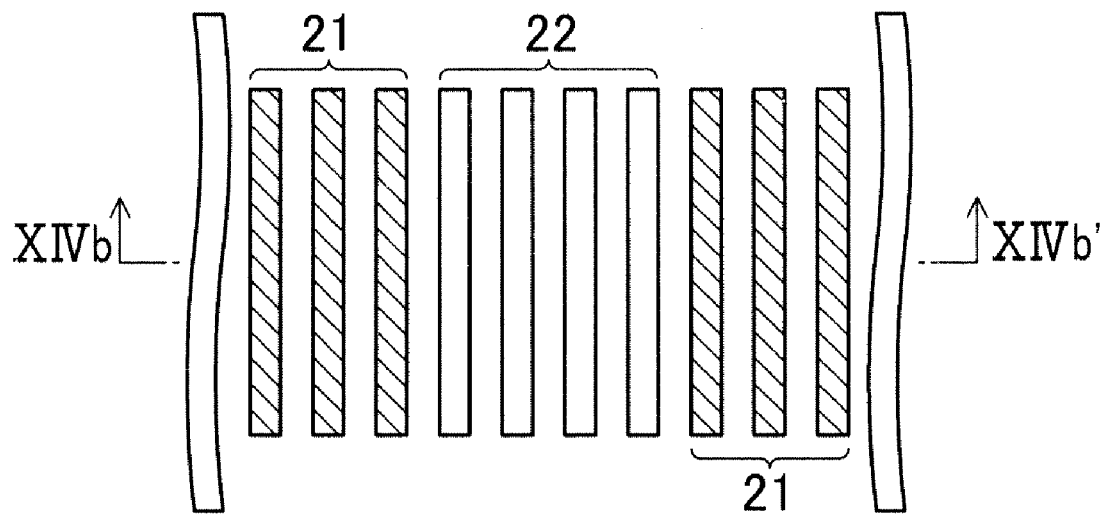
FIGS. 14A and 14B are diagrams illustrating a situation where dummy features parallel to real features are provided.
Figure 14B:
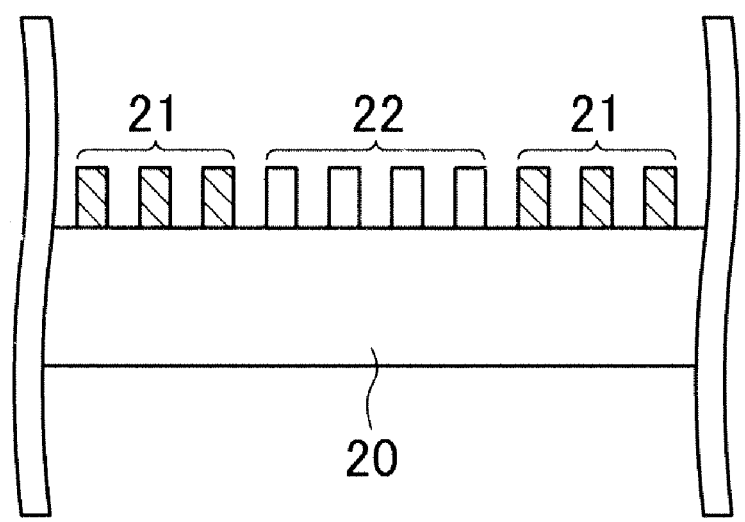
Figure 15A:
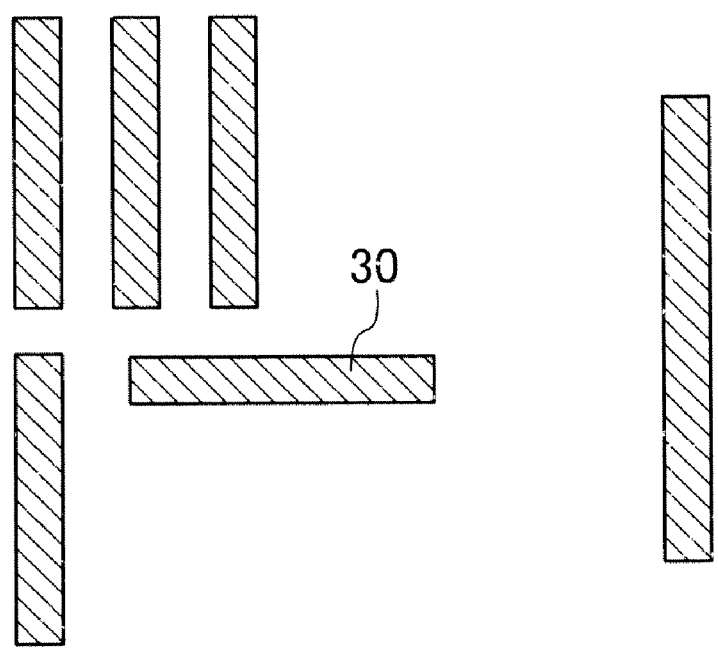
FIGS. 15A and 15B are diagrams illustrating a situation where dot-shaped dummy features are provided around line end portions.
Figure 15B:
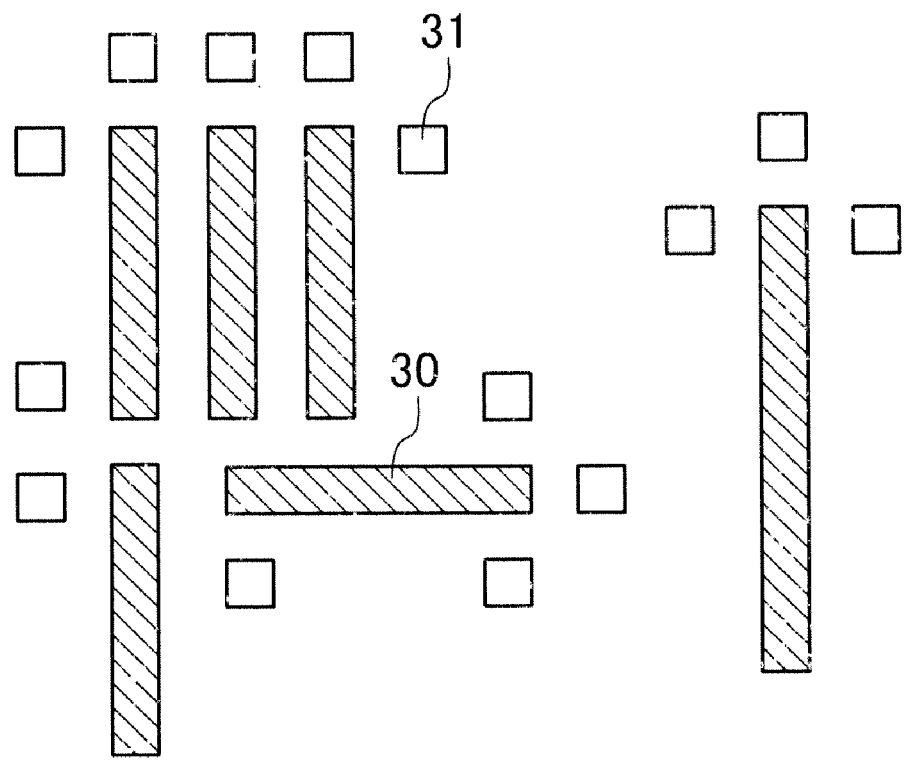

Next, FIG. 12 illustrates a circuit pattern according to a variation of this embodiment. Similar to FIG. 4, FIG. 12 illustrates a logic circuit including a plurality of cells in a library. However, FIG. 12 is different from FIG. 4 in that in FIG. 12, a plurality of transistors having different gate lengths coexist.

Specifically, not only real features 1203, gate portion uniformization dummies 1205, and a line end portion uniformization dummy 1202 similar to those in FIG. 4, but also wider features 1201 (line features each having a greater line width) each having a greater gate length than each of the real features 1203 are provided. Specifically, the wider features 1201 may be each configured so that at least gate electrode portions 202 of a plurality of adjacent line features are connected together. Thus, the gate length of each of the wider features 1201 is obtained by adding an integral multiple of the pitch between each adjacent pair of line features (the sum of the line width of each of the real features 1203 and the interval between each adjacent pair of the real features 1203) and the line width of each of the real features 1203.

The wider features 1201 are placed in parallel with at least one gate portion uniformization dummy 1205 interposed between the wider features 1201 and the real features 1203. Moreover, the wider features 1201 are terminated so that portions of the wider features 1201 adjacent to the cell boundaries are flush with line end portions of the other line features (the real features 1203 and the gate portion uniformization dummies 1205), and include evenly spaced protrusion portions 1201a having the same width. This can provide uniform layout feature densities on surrounding regions of the line end portions including surrounding regions of the wider features 1201 also when a circuit pattern including real features 1203 of predetermined width further includes wider features 1201.

As described above, gate portions of a feature forming electrode portions of a gate layer can be formed with accurate and uniform line widths, and the line end portions forming gate protruding portions can be formed with accurate and uniform dimensions and shapes. This can provide an LSI with higher performance. Furthermore, mask correction involving accurate simulation, etc., is not essential, and thus, the time required for the mask correction can be reduced.

According to the semiconductor device of the present disclosure and the layout design method for the same, features forming gate electrodes can be formed with high accuracy, and the time required to design a layout can be reduced. Therefore, the present disclosure is useful for a layout design method providing a high-performance LSI and a semiconductor device using the same.

What is claimed is:

1. A semiconductor device comprising:
   a plurality of line features including at least one real feature which includes a gate electrode portion and a protruding portion protruding beyond the gate electrode portion by a predetermined distance, and at least one dummy feature placed in parallel with the at least one real feature,
   wherein two of multiple ones of the dummy feature, and at least one of the line features interposed between the two dummy features and including the at least one real feature form parallel running line features extending in parallel so as to be evenly spaced,
   the parallel running line features have an identical width while at least one end portions of the parallel running line features form line end portions substantially flush with one another,
   line end portion uniformization dummy features are formed on extensions of the line end portions of the parallel running line features so that the distances between the line end portions and corresponding line end portions of the line end portion uniformization dummy features are equal,
   the line end portion uniformization dummy features include a plurality of linear features each having a same width as each of the line features and spaced at intervals equal to an interval between each adjacent pair of the line features,
   wherein both end portions of the parallel running line features form the line end portion terminated so that the line end portions are substantially flush with one another, and
   features forming mirror images of the line end portions about a line are formed on extensions of the line end portions forming both end portions of the parallel running line features so that the distances between the line end portions and corresponding line end portions of the features are equal.

2. The semiconductor device of claim 1, wherein
   the plurality of linear features of the line end portion uniformization dummy features are connected together.

3. The semiconductor device of claim 2, wherein
   the plurality of linear features of the line end portion uniformization dummy features are connected together in the vicinities of middles of the linear features in a lengthwise direction.

4. The semiconductor device of claim 1, wherein
   the parallel running line features each form a continuous feature, and the lengths of the linear features along a line direction are equal to one another.

5. The semiconductor device of claim 1, wherein
   out of the parallel running line features, the at least one line feature interposed between the two dummy features includes both the real feature and the dummy feature.

6. The semiconductor device of claim 1, wherein
   the length of each of the line end portion uniformization dummy features in a line direction is shorter than the length of each of the parallel running line features in a line direction.

7. The semiconductor device of claim 1, wherein
the line end portion uniformization dummy features are formed in a pair so that a region including the at least one real feature is interposed between the line end portion uniformization dummy features.

8. The semiconductor device of claim 1, wherein
a region including the at least one real feature is surrounded by at least two types of the dummy features, and out of the at least two types of the dummy features, one type of the dummy features are the line end portion uniformization dummy features.

9. The semiconductor device of claim 1, wherein
a connecting feature which connects the line end portion uniformization dummy features along a longitudinal direction perpendicular to a longitudinal direction of the line end portion uniformization dummy features has a length greater than or equal to approximately 4 μm.

10. The semiconductor device of claim 1, wherein
when a wavelength of exposure light is $\lambda$, and a numerical aperture of an exposure apparatus is NA, the parallel running line features each have a width less than or equal to approximately $0.5 \times \lambda/NA$.

11. The semiconductor device of claim 1, wherein
when a wavelength of exposure light is $\lambda$, and a numerical aperture of an exposure apparatus is NA, the protruding portion has a length less than or equal to approximately $0.5 \times \lambda/NA$.

12. The semiconductor device of claim 1, wherein
when a wavelength of exposure light is $\lambda$, and a numerical aperture of an exposure apparatus is NA, each of the distances between the line end portions and corresponding line end portions of the line end portion uniformization dummy features is less than or equal to approximately $0.5 \times \lambda/NA$.

13. The semiconductor device of claim 1, wherein
when a wavelength of exposure light is $\lambda$, and a numerical aperture of an exposure apparatus is NA, a length of each of the line end portion uniformization features in a line direction is greater than or equal to approximately $0.5 \times \lambda/NA$.

14. The semiconductor device of claim 1, wherein
when a wavelength of exposure light is $\lambda$, and a numerical aperture of an exposure apparatus is NA, a width of each of connecting portions providing connection between the linear features included in the line end portion uniformization dummy features is greater than or equal to approximately $0.3 \times \lambda/NA$.

15. The semiconductor device of claim 1, wherein
the at least one real feature is a metal gate.

16. The semiconductor device of claim 1, wherein
the parallel running line features include a wider feature having a width obtained by connecting the plurality of adjacent line features together and including protrusion portions which have a same width as each of the line end portions, extend in parallel with the line end portions so as to be spaced at a same interval as the interval between each adjacent pair of the line end portions, and are terminated so that the protrusion portions are flush with ends of the other line features.

17. A layout design method for a semiconductor device including real features which each include a gate electrode portion, and dummy features placed in parallel with the real features, the method comprising:
forming via a computer a layout pattern of standard cells each including the at least one real feature and the at least one dummy feature and occupying a rectangular region; and
placing line end portion uniformization dummy features around a logic circuit region including multiple arranged ones of the standard cell after formation of the logic circuit region,
wherein the forming includes:
forming at least one of the real features which includes a gate electrode portion, has a predetermined width, and extends in a predetermined direction;
placing the real feature on a corresponding one of evenly spaced parallel grid lines virtually provided in a rectangular cell region;
placing the dummy features having a same width as the real feature on empty regions of the corresponding grid line except for a region of the corresponding grid line on which the real feature is placed; and
aligning the real feature and the dummy features both terminated while facing some of boundaries of a corresponding one of the standard cells which are perpendicular to a direction of extension of the real feature so that line end portions of the real feature and the dummy features are substantially flush with one another, and
the placing the line end portion uniformization dummy features includes:
placing a plurality of linear features forming mirror images of the line end portions about a line on extensions of the line end portions toward at least one of the boundaries so that distances between the line end portions of the real feature and the dummy features and corresponding line end portions of the plurality of linear features are equal; and
forming a feature obtained by connecting the plurality of linear features together.

* * * * *